May 31, 1960 J. A. KONINS ET AL 2,938,962

AZIMUTH SEEKING REPRODUCING HEAD

Filed July 12, 1955 2 Sheets-Sheet 1

INVENTORS
JULIUS A. KONINS
KENNETH ROBINSON
HENRY C. POLLAK

BY

Ostrolenk, Faber, Gerb & Soffen
ATTORNEYS

May 31, 1960 J. A. KONINS ET AL 2,938,962

AZIMUTH SEEKING REPRODUCING HEAD

Filed July 12, 1955

2 Sheets-Sheet 2

INVENTORS
JULIUS A. KONINS
KENNETH ROBINSON
HENRY C. POLLAK

BY Ostrolenk, Faber, Gerb & Soffen
ATTORNEYS 2,938,962

AZIMUTH SEEKING REPRODUCING HEAD

Julius A. Konins, Long Island City, Kenneth Robinson, Bronx, and Henry C. Pollak, Hollis, N.Y.; said Robinson and Pollak assignors to said Konins Filed July 12, 1955, Ser. No. 521,540

8 Claims. (Cl. 179—100.2)

This invention relates broadly to signal reproducing systems such as for sound, telemetering, computers and the like. More particularly, this invention involves the arrangement of reproducing heads to automatically and continuously orient themselves into optimum or azimuth relationship with respect to the moving record medium. The invention has direct utility in magnetic recording-reproducing systems for sound and signals and in the systems employing photographic or optical heads for translating sound and signals.

In magnetic systems, as is well known, magnetic heads are used in conjunction with magnetizable tape. The magnetic heads have laminations of magnetic material arranged with a non-magnetic gap at the recording or reproduction portion over which the magnetic record medium passes. A suitable coil means about the laminated head core is used to impress magnetic variations across the non-magnetic gap, in the case of recording on the medium and to pick up magnetic variations at the gap, in the case of reproduction or pick-up of the magnetic record on the medium passing across the gap. The magnetizable tape is magnetized transversely of the longitudinal direction of its movement. In an optimum system, the non-magnetic gaps of the heads are generally perpendicular to the longitudinal direction of the tape and parallel to the transverse magnetic signals thereon. This perpendicular relationship of the magnetic head gap to the tape or signal path is called its azimuth position.

For high quality recording and reproduction, it is important that the reproducing or pick-up head be arranged with its gap in the exact angular relation or angle as that of the transverse magnetic signals impressed on the tape. In the event that the recording head was in its true azimuth relation with the tape during the recording, the magnetic transverse impressions on the tape will also all be in the perpendicular or azimuth relation. If off perpendicular, the signals are likewise off by the same angle. Accordingly, for reproduction of the impressed signals on the tape with minimum distortion and/or loss, it is essential that the nonmagnetic gap of the reproducing head be at the same azimuth or angular relation with the longitudinal movement of the tape as the recorded signals thereon. The higher the frequency recorded on the tape, the more important it is that the true and proper angular relation persist of the reproducing head to the magnetic signals on the tape. Systems in the prior art have devised means for manually adjusting the azimuth or angular position of the recording and/or reproducing heads on their machines, with respect to the tape. Thus, only one optimum compromise position is afforded in the reproduction of the signals during a play back of a tape.

Such manual adjustments of recording heads and/or reproducing heads are tedious and often inaccurate without complex auxiliary test equipment. Furthermore, it is a bothersome task to require the operator to manually adjust such heads, particularly in reproducing various successive tapes, each recorded from different machines. More importantly, it has been found that in the transcription of a single tape, variations occur in tape tension that cause changes in the angle of contact pressure between the tape and the magnetic head, in turn resulting in the slight variations in the azimuthal angle of the non-magnetic gap. Such azimuth variations result in the distortions aforesaid. Finally, irregularities in the tape itself and/or in the tape drive mechanism cause temporary or indeterminate variations in the transverse angular relationship of the transcription head gap with respect to the signals on the longitudinal tape.

In accordance with the present invention, the reproducing head is automatically aligned with respect to the moving record medium in a manner to continuously maintain its proper alignment with respect to the recorded signals. Such automatic alignment is performed independently of the angle of the recorded signals on the tape, the tape position, or irregularities in the tape or its drive mechanism. The angular position of the reproducing head gap with the recorded signals along the tape is continuously measured or determined qualitatively and translated into signal impulses that actuate an alignment mechanism to bring the angular relationship into true reproducing azimuth. The invention is equally applicable to magnetic systems having a magnetizable tape or drum and a reproducing magnetic head with a gap across the tape, as to a photographic film with signals picked up by an optical head having a light slit.

In a modification of the invention, the reproducing head is maintained fixed and the tape or film transport system is actuated to adjust the alignment of its axis with respect to the head to afford the same result. In practical systems, the amount of the angular adjustment required between the head gap or slit and the tape or film axis is minute, of the order of one or a few degrees of arc at the most, often within minutes of arc for the highest frequencies audible.

It is a principal object of the present invention to detect angular misalignment between the pick-up head gap (or slit) and the direction of the signals impressed on the recording medium, and to continuously relate such gap into optimum recording position to the recorded signals or true azimuth.

It is to be understood that the present invention may take various forms and arrangements, as well as used in diverse applications. While the illustrations of the invention will basically be made in connection with magnetic sound recording reproduction systems, it is to be understood that it is equally applicable to the magnetic reproduction of signals in general as for telemetering, computers, etc. The invention is also directly applicable to systems of photographically and/or optically recording and reproducing sounds, or other signals. The problem in optical systems is similar in that the angle of the optical slit is related, for an optimum, to the axial direction of the film and the angle of the recorded transverse optical impressions on the film.

The system of the present invention is directed to overcome the distortions, inaccuracies and attenuations of reproduced signals due to the angular position of an optical head or magnetic transducer. In the case of multi-head or multi-track systems, it is particularly important to hold the proper azimuth or angular relationship of the plurality of heads with respect to the recorded signals and the medium moving with respect thereto. In fact, it has been determined that phase shift or time lag between the first and last channels on a multi-track system, due to angular dislocation of the heads, limits the speed of the tape for safe intelligent translation, as will be set forth hereinafter.

It is accordingly an object of the present invention to provide a novel recording-reproducing system wherein the pick-up transducer thereof is automatically adjusted into proper angular relationship with the signals on the moving record.

Another object of the present invention is to provide a novel magnetic reproduction system wherein the magnetic head is continuously adjusted with its non-magnetic gap into optimum alignment position with respect to signals recording on the moving tape.

Another object of the present invention is to provide a novel reproducing system automatically aligning its transducer with respect to signals on a recorded medium.

Another object of the present invention is to provide a novel system for automatically aligning a transducer into optimum angular relationship with signals recorded on a medium moving across the transducer.

A further object of the present invention is to provide a novel reproduction system providing optimum translation of signals recorded on a tape or film, independent of irregularities in the tape transport, tape drive or tape tension means of the system.

Still another object of the present invention is to provide a multiple channel reproduction system wherein the plurality of heads thereof are maintained in automatic predetermined alignment with respect to the signals on multiple tracks.

These and other objects of the present invention will become more apparent from the following description of exemplary embodiments thereof, illustrated in the drawings, in which.

Figure 1:
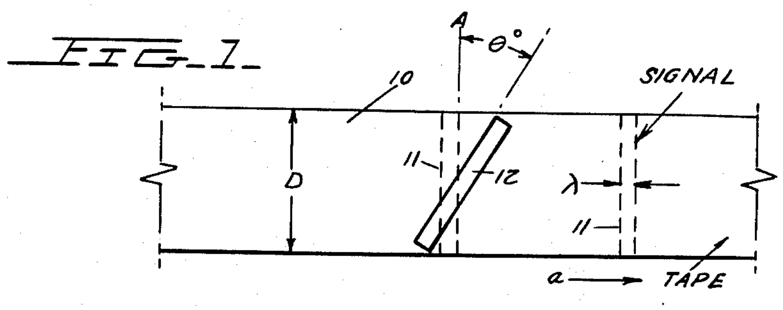
Figure 1 is a diagrammatic illustration of signal parameters with respect to a magnetic tape.

Figure 1 shows a tape 10 which, for magnetic systems, contains a surface layer of magnetizable particles, as is well known in the art. Tape 10 is moved in the direction *a* shown by the arrows, to the right. In the case of a photographic system, the tape 10 is replaced by photosensitive film with optical signals impressed thereon in place of magnetizable signals. A magnetic head is engaged to contact tape 10, having a gap arranged transversely of the direction *a* of the tape and parallel with the signals 11 impressed thereon, also as is well understood in the art. In the case of photographic signal reproduction, an optical slit is used instead of a gap in the optical translation or transducer head.

The degree of angular misalignment of the head gap (or slit) with respect to the signals 11 on tape 10 is small in practice, namely minute angular variations, of the order of one degree or less. However, for purposes of illustration, such angular displacement from true azimuth is exaggerated in the drawings. The non-magnetic gap of the magnetic head is indicated by rectangle 12, at an angular displacement $\theta°$. There is a definite mathematical relationship for the loss of signal strength or distortion in accordance with angular displacement $\theta°$ between gap 12 and the recorded signals 11 on tape 10. In case of a photographic transducer, the gap 12 is replaced by an optical slit, all other considerations to be described herein corresponding in the two basic systems.

The width or wave length of signal 11 impressed on tape 10 is identified by the mathematical symbol $\lambda$. The higher the recorded signal frequencies for a given tape speed, the narrower the dimension $\lambda$; and conversely, the lower the recorded signal frequency, the greater the wave length or $\lambda$ therefor. It will be noted that losses due to azimuth angular displacement $\theta°$ are more sensitive at the higher frequencies, namely with a narrower $\lambda$ dimension, as compared to that of the lower frequencies. It is thus of particular importance to have a minimum or zero value for $\theta$ as the quality or range of frequency of recording is extended upwardly. The width of the transverse dimension of the signal band effective on the tape 10 is indicated by D.

A well-known mathematical relationship exists for the parameters corresponding to the losses incurred due to varying angular discrepancies corresponding to $\theta°$, from the true azimuth position A. The azimuth position A is perpendicular to the axis of the tape 10 or its direction of movement when the signals 11 recorded thereon are in perfect alignment thereto. However, it is to be understood that the azimuth A position to which the optimum position of magnetic gap 12 is related corresponds to the angle of the signals 11 as recorded on the tape should such signals be non-perpendicular. The mathematical relation of loss in db is as follows:

$$\text{(1)} \qquad \text{db loss}=20\log_{10}\frac{\dfrac{\sin \pi D\tan\theta}{\lambda}}{\dfrac{\pi D\tan\theta}{\lambda}}$$

Figure 3:
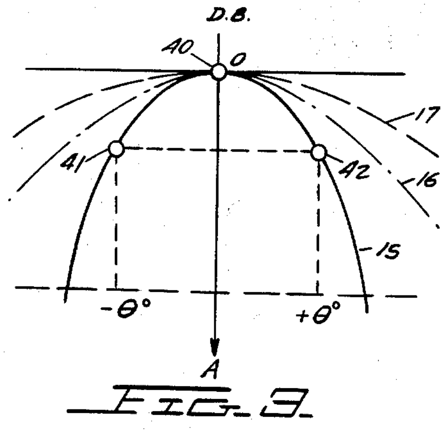
Figures 3 and 4 are diagrammatic curves illustrating features of the alignment-sensing units described in connection with Figure 2.
Figure 4:
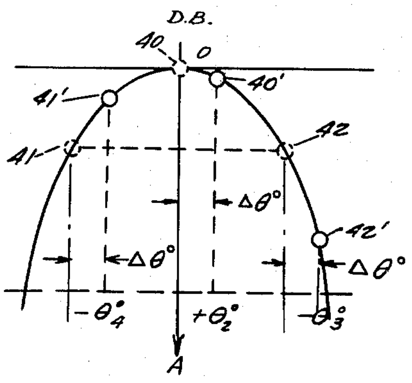

A typical value of $\lambda$ for a signal corresponding to 15,000 cycles at a tape speed of 7.5 inches per second is: $\lambda$=.0005. The loss in db of such signal with a displacement of only the order of about 15 minutes of arc from the azimuth A position may be of the order of 30 db. This is indicated to show how critical is the true azimuth relationship of gap 12 with respect to the signals 11. Figure 3 shows a single family of multiple curves related to such angular distortion factors resulting from loss Formula 1. Solid line curve 15 extends from the zero azimuth or A position at a zero db loss and is in the form of a hyperbolic curve sharply extending the losses to the order of 30 db's wherein plur or minus 30 db loss is due to only a matter of 10 to 20 minutes of arc displacement $\theta°$, but is less steep and corresponds to a lower frequency than curve 15, say 10,000 cycles. Similarly, curve 17 of dashed lines illustrates the lowest of the three frequencies, with a less steep drop in attenuation with increasing $\theta°$, such as 4,000 cycles. As heretofore stated, it is thus apparent that the higher the frequency or quality of the reproduction desired, the sharper the loss that occurs due to off-azimuthal angular relationships of the gap or optical slit 12 from the A or signal positions 11 (Figure 1). More detailed groups of curves illustrating Formula 1, as well as the relationship of the parameter D in the same formula, are illustrated in Figures 3 and 4 of Patent No. 2,673,897, which issued March 30, 1954.

Figures 2, 2A:
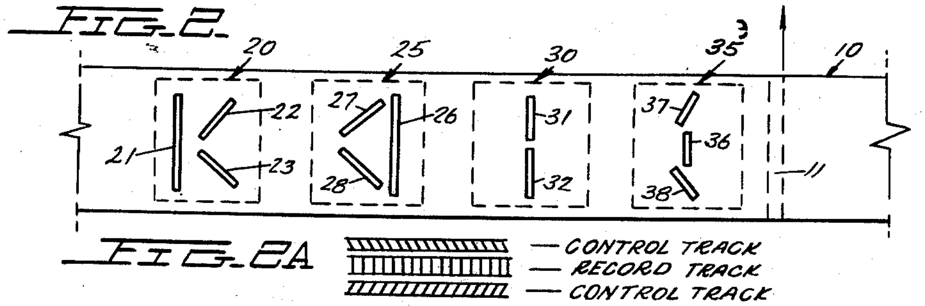
Figure 2 is a diagrammatic illustration of a series of alignment-sensing head units for a magnetic tape.
Figure 2A is a view of a tape with one or more control tracks.

In accordance with the invention herein, a pair of sensing pick-up heads is engaged with the recording track in a manner to detect or otherwise determine when the passage of the signals recorded on the track are off azimuth angularly with respect to the sensing pick-up heads. Figure 2 diagrammatically illustrates such sensing heads in various practical arrangements. Such pairs of sensing pickup heads may be used directly or in combination with a third pick-up head to form an integrated pick-up unit for the purposes of the invention herein. Such integrated units are indicated at 20, 25, 30 and 35 in Figure 2.

Unit 20 comprises a normal magnetic pick-up head diagrammatically indicated at 21 by the position of its gap. Gap 21 for the basic pick-up head (not shown) is perpendicular to the longitudinal axis of tape 10, being in the normal transcription or reproduction relationship close to the azimuth angular A position. Further pick-up heads 22 and 23 are arranged within unit 20 along the signal path of tape 10 subtended by head 21 but at inclined or definite angular relationships to the longitudinal axis of tape 10. The pick-up heads corresponding to the gaps 22, 23 are arranged at corresponding angular positions in unit 20 wherein the angle of gap 22 to gap 21 is equal to the angle of gap 23 to gap 21.

When unit 20 is arranged in true azimuth A position for recorded signals 11 on tape 10, the gap 21 for the basic pick-up head will be exactly parallel with a zero $\theta°$ relationship to the direction of signals 11, at which time the respective angles of the heads corresponding to the gaps 22 and 23 will be equal and opposite with respect to the direction of signals 11 on tape 10. Heads 22, 23 will thereupon pick up equal signal strengths of the same signals corresponding to 11 recorded on tape 10. Thus, the pick-up heads represented schematically by the gaps 22, 23 will pick up equal signals when in the proper azimuth relationship; and correspondingly, unequal signals when the unit 20 (and head 21) are off the azimuth angular relationship. The reason for such unequal signal pick-ups by heads 22, 23 will be set forth in connection with the description of Figure 4 hereinafter.

The arrangement of sensing pick-ups 22, 23 with respect to tape 10 and/or to the pick-up head 21 may be varied as will be evident now to those skilled in the art. The unit 25 is similar to unit 20 wherein the normal transverse pick-up gap 26 corresponds to the pick-up gap 21 of unit 20, and the opposed angular sensing pick-ups represented by gaps 27 and 28 are related to the transverse basic pick-up unit 26. The operation and functions of unit 25 and its associated pick-up heads 26, 27, 28 are identical to those within unit 20.

The sensing pick-up unit 30 comprises only two pick-up heads, corresponding to the gaps 31 and 32. In the case of unit 30, the sensing heads 31, 32, when in the proper azimuth A position, are both parallel to the recorded signals 11. Thus, the need for a third pick-up head is obviated, and one alone or both heads 31, 32 are paralleled for the reproduction of the basic signals. For the sensing purposes, in the system of the invention, the heads 31 and 32 are used separately, as will be evident as the disclosure progresses.

The unit 35 comprises three magnetic pick-up heads, having a central vertical basic pick-up head 36 arranged parallel to the signals 11 recorded on tape 10 and corresponding to pick-up heads 21 and 26 of the previously described units 20 and 25, respectively. The head 36 has, on either side and within the extent D of the transverse recorded signals 11, two sensing pick-up units schematically shown at 37 and 38. The length of the gaps of pick-up units 36, 37 and 38 are shorter than those of the previously described units in view of their disposition across D. However, the angles of units 37 and 38 with respect to the perpendicular unit 36 are equal and opposite and serve the same sensing function as the sensing pick-ups of the other units shown in Figure 2.

Figures 3 and 4 diagram the basic attenuation or loss in db relationships of a pick-up head with respect to its off-azimuth angular relationship with the recorded signals 11 on tape 10 as heretofore referred to. Curve 15 thereof shows the loss relationship at a single frequency; it being understood that a family of curves, such as 16 and 17, indicates other frequency relationships. The position 40 on curve 15 corresponds to that of the basic pick-up for magnetic heads corresponding to the vertical gaps 21, 26 or 36 of the units in Figure 2. It also corresponds to the basic pick-up utilization of either or both of the heads 31, 32 of unit 30.

The positions 41 and 42 in Figure 3 diagrammatically represent equal and opposite angular displacements due to the angular relationship of the sensing pick-up heads 22, 23 of unit 20; 27, 28 of unit 25; and 37, 38 of unit 35. It is noted that due to such angular displacement of the sensing pick-ups with respect to the azimuth, a lower level of the signal is picked up than at the optimum A at zero degrees corresponding to position 40. However, when a unit 20, 25, 30 or 35 as a whole is tilted or otherwise angularly displaced with respect to azimuth A, the relationships illustrated in Figure 4 pertain.

Referring to Figure 4, the basic pick-up head 40 is moved to the new position 40' at an angular relation $\theta_2°$, corresponding to an angular displacement from azimuth of $\Delta\theta°$. In other words, the $\Delta\theta°$ is the angular displacement corresponding to the angle $\theta°$ shown in Figure 1. Since the sensing units corresponding to 41 and 42 are integral and integrally related structurally with the basic pick-up 40, they likewise are moved in the same displacement corresponding to $\Delta\theta°$ with respect to their former positions. The position 41' illustrates the movement along curve 15 to $-\theta_4°$ of sensing pick-up 41 from its old position $-\theta_1°$; and 42' to $+\theta_3°$ from its old position 42 at $+\theta_1°$, all at the $\Delta\theta°$ displacement. In the case of the sensing unit corresponding to 41, the signal picked up at 41' is greater; and in the case of the sensing unit corresponding to 42', the signal picked up is lower than at position 42.

It is thus clear that while a relatively small distortion or diminution of signal at the frequency of curve 15 occurs in the basic pick-up unit 40 at 40', the relative pick-ups of the sensing units at the positions 41' and 42' are such as to be quite distinct and diverse. It will now be apparent to those skilled in the art that a system is afforded herewith wherein a large magnitude difference occurs between the signals picked up, at any frequencies, by the sensing heads of the units of Figure 2 even though the corresponding diminution of signal at any frequency may be small for the basic pick-up head. The invention utilizes such sensing unit discrepancy in pick-up strengths to provide automatic correction to the azimuthal displacement of the basic reproduction head, which in turn returns the sensing heads to their normal angular relationship to the azimuth and with equal differential signals.

The angle of the alignment heads may be adjustable for various degrees of sensitivity.

In place of the angularly displaced control heads of Figure 2, it is possible, of course, to align the control heads with the play back head at a desired angle and to utilize control tracks to cooperate with the alignment heads, the control tracks being cocked as in Figure 2A.

The tape itself may be marked therefore with control stripes which in this case are magnetic but which may be optical to cooperate with optical control means—or dielectric (pulses) or mechanical (notches, perforations).

Also, while the alignment and play back heads are shown mounted together, they may be separately mounted with the alignment head stationary and linked by signal and appropriate memory devices to the play back head to control its azimuthal relationship to the tape.

It is possible even to have a controlled misalignment, which was not possible before, for frequency control purposes. Thus, misalignment is known to have frequency cutoff results. Therefore, controlled misalignment may be used for frequency cut-off or control purposes to obtain the equivalent of a notch filter. Since, as misalignment progresses beyond a certain point, another frequency peak occurs, creating in effect a notch filter, controlled misalginment may be used for instance to cut out a 10 kc. whistle. Controlled misalignment may also be used for instance for tone control and sharp cut-off action.

It is also possible to utilize controlled misalignment on a multi-track tape to obtain purposeful misphasing and other effects which may be used for various purposes.

To obtain full control of alignment and/or misalignment, the play back head may be made adjustable independently of the alignment heads. In addition, control of the position of the tape may be used together with or as a substitute for alignment of the play back head for the same purpose, or to move the head in and out to maintain appropriate contact with the tape.

Control in this way can also be obtained of any kind of head including but not limited to electronic play heads of the type described in Proceedings of Department of Defense Symposium on Magnetic Recording, March 1954, Paper No. 2—Vacuum Tube for an Electron Beam Magnetic Reproducing Head.

Figure 5:
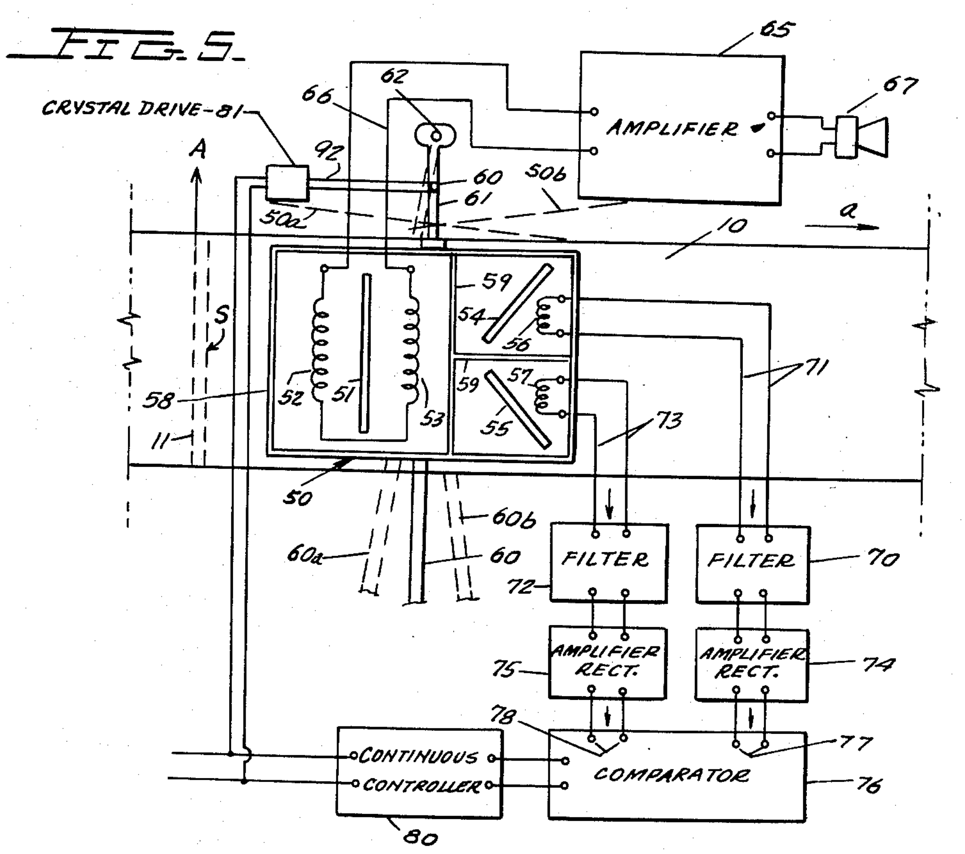
Figure 5 is a schematic showing of an exemplary embodiment of a transducer aligning system, in accordance with the present invention.

Figure 5 is a schematic and diagrammatic representation of an overall system embodying the sensing units and azimuthal correction of the angular relationship of the main pick-up head in a magnetic transcription system. It is to be understood that the system is also applicable to photographic optical film arrangements in a similar manner. A composite pick-up unit 50 is arranged across the signal 11 position on magnetic tape 10. Unit 50 is indicated diagrammatically as containing the main pick-up head with gap 51 and associated coils 52, 53; and two sensing pick-up heads having gaps 54 and 55 with associated respective pick-up windings 56, 57. The composite pick-up unit 50 corresponds to that diagrammatically indicated at 20 in Figure 2, and other arrangements such as shown in Figure 2 may instead be used. Unit 50 is duly housed in metallic structure 58 and the respective magnetic pick-up heads are shielded magnetically at 59.

Composite pick-up unit 50 is structurally connected to a rod 60 extending from its basic assembly and projecting at the opposite side at portion 61 pivoted at 62. The various leads extending from the coils within pick-up unit 50 are flexible to permit angular tilting of the unit with respect to the azimuthal angular relationships to signals 11. Thus, the unit 50 may be tilted to the left such as position 60*a*, or to the right 60*b* of rod 60, affording corresponding angular deviations for assembly 50 as indicated at 50*a* and 50*b*, respectively, in Figure 5. The actual angular displacements illustrated by the dashed lines of Figure 5, for unit 50 and rod 60, are exaggerated with respect to those encountered in practice, as will be understood for purposes of clarity of illustration.

The invention system is arranged to angularly displace rod 60 in a manner to automatically bring composite pick-up unit 50 into the true azimuth relationship with respect to the signals 11 recorded on tape 10, and to continuously maintain such azimuthal relationship throughout the transcription of tape 10. The main pick-up head, represented by the gap 51 transversely across tape 10, and the pick-up coils 52, 53 are connected to the amplifier 65 through leads 66, 66. Amplifier 65 has suitable controls as to level, tone, etc. to produce suitable amplification of the signals for loud speaker 67 in the usual practice.

The sensing pick-up units, corresponding to the gaps 54, 55, each extend substantially across half of the track width for signals 11 on tape 10. They pick up sizeable signals despite their angular relationship to the azimuth A. The magnetic pick-up for gap 54, through pick-up coil 56, is impressed upon a signal filter 70 through leads 71; and a signal from the pick-up for gap 55 through coil 57, to filter 72 through leads 73. In an exemplary embodiment, filters 70, 72 were arranged to pass the higher frequency components of the information or music recorded on tape 10 by sound tracks 11. As the signal strength to the reproducing heads is diminished at the higher frequencies when in off-azimuth relationship to A, the discrepancy of signal pick-ups for gaps 54 and 55 is greater at the higher frequencies for a given $\theta°$ displacement of unit 50. The differential response at filters 70, 72 will correspondingly be greater for a given angular displacement between the sensing units 54, 55 at the higher frequency spectrum than the lower.

An amplifier-rectifier unit 74 is connected to the output of filter 70; and a corresponding amplifier-rectifier 75 to the output of filter 72. Units 74, 75 serve to duly amplify the output of the filters 70, 72 and rectify their respective outputs preferably to direct current components. It will now be understood that the outputs of units 74 and 75 will be equal when the pick-up unit 50 is in the azimuth A angular position corresponding to 60 for the rod thereof. The output signal strengths of units 75 and 74 will differ when unit 50 is off the azimuth A position. When the unit 50 is in the position 50*a*, and off with respect to a normal azimuth to signal 11 (position A), the gap 54 will be at a greater angle to the signal (at A) than is gap 55 of the sensing unit thereto. Thus, the signals picked up by coil 57 will be greater than that picked up by coil 56; and correspondingly, the signal output of amplifier-rectifier 75 greater than that out of unit 74.

When the reverse angular displacement of unit 50 occurs with respect to the signal 11 at azimuth A, namely to position 50*b* (also position 60*b* for its rod), sensing gap 54 becomes closer aligned to angular position A and sensing gap 55 at a greater angle from azimuth A. Thus, the corresponding signal output for condition 50*b* from amplifier-rectifier 74 would be greater than out of 75. As already stated, when the unit 50 is at its azimuthal relationship with signal 11 at A, namely with a zero $\theta°$ value, the signals picked up across gaps 54 and 55 are equal, in view of their equal angular relationship to A, and the signals from units 74 and 75 are equal.

Summarizing the action of the sensing device 54, 55, when pick-up unit 50 is on azimuth (A) with respect to the recorded signals 11 on tape 10, the signal outputs from amplifier-rectifiers 74, 75 are equal. When pick-up unit 50 is at an angular relationship to track 11 for an off-azimuth position A, the outputs of amplifier-rectifier units 74 and 75 will differ in accordance with the direction of the off-azimuth displacement. A positive electrical sensing signal system is accordingly afforded by the composite pick-up unit 50 incorporating the sensing heads 54, 55 and the filter and amplifier-rectifier units illustrated in Figure 5.

The outputs of the amplifier-rectifier units 74, 75 are impressed upon a suitable electronic or electromechanical comparator unit indicated schematically at 76. The comparator 76 simply compares the relative signal strengths impressed upon it at inputs 77 and 78 thereof through the units 74 and 75, respectively. The output of comparator 76 is impressed upon a controller unit 80. Whereas comparator 76 converts the respective amplitudes impressed at input 77, 78 and converts them into a signal of definite polarity for the controller 80, the controller 80 converts the comparator signal to a polarity output current impressed upon the crystal drive unit 81. Controller 80 may convert the comparator signal 76 either to a direct current having a plus or minus or zero output, in accordance with the sense of the resultant 54, 55 output; or into an alternating current signal having opposite phase relationships in accordance with the amplitude sense displacement between 54, 55 with a zero output at zero $\theta°$ displacement.

Drive unit 81 generates sufficient signal output to directly operate the arm 60 to which it is connected by link 92. Since in practice the angular displacements of units 50 are small, and the mass of the overall unit light, only a small amount of power is necessary in the system of Figure 5.

It will now be apparent to those skilled in the art that when an off-azimuth relationship occurs between the main pick-up head represented by non-magnetic gap 51 of unit 50, the sensing units represented by gaps 54, 55 immediately provide a differential signal input to comparator 76, sensed in accordance with the sense of the angular deviation from azimuth A of the recorded signal 11 on tape 10. Should there be a displacement of unit 50 for any reason, to an angular deviation corresponding such as to 50*a* (and position 60*a* of rod 60), the stronger signal from pick-up coil 57 with respect to coil 56 operates comparator 76, controller 80 and drive crystal 81. Rod 60 is thereupon moved back to the solid line position 60, the pick-ups to position 50, all in the azimuth or A relationship with signal 11.

Conversely, should the unit 50 be displaced oppositely with respect to the true position A of signal 11, such as at position 50*b*, the reverse sensing and relative outputs of the signals occurs across comparator 76, and crystal 81 operates to retract rod 92 to the left bringing the corresponding position 60b of the shaft back to azimuth position 60. Such actuation of rod 60 and unit 50 occurs immediately upon a displacement or azimuthal angular displacement $\Delta\theta°$ of pick-up gap 51 with respect to track 11 on tape 10.

The operation of the system herein is immediate as the sensing by gaps 54, 55 is continuous. Therefore, the smallest angular deviations that would cause distortion in the signals picked up by unit 51 and transmitted to amplifier 65 result in a compensating movement of rods 92 and 60 to automatically maintain unit 50 in azimuthal relationship with recorded signal track 11. Such alignment maintenance occurs despite the source of the tendency for angular discrepancy, whether due to change in the angular relationship of the track 11 as recorded on tape 10, or an irregularity in the tape 10 itself or in its drive mechanism.

The continuous sensing and proper tracking of the pick-up unit 50 of the invention with respect to the signals 11 on tape 10 to the output affords a higher resultant quality of reproduction as is desirable for consumer enjoyment and as is absolutely essential where recordings are further transcribed for multiple recording from a master tape. The system herein continuously adjusts itself to correct angular tracking deviations without hunting or further extension of angular displacement, resulting in true fidelity of reproduction of the signals to amplifier 65. For a given band of signal reproduction less speed or less tape is needed with the system of the present invention, minimizing and in a practical manner eliminating distortions due to off-azimuth conditions between the recorded signal 11 and the pick-up head 51.

Figure 6:
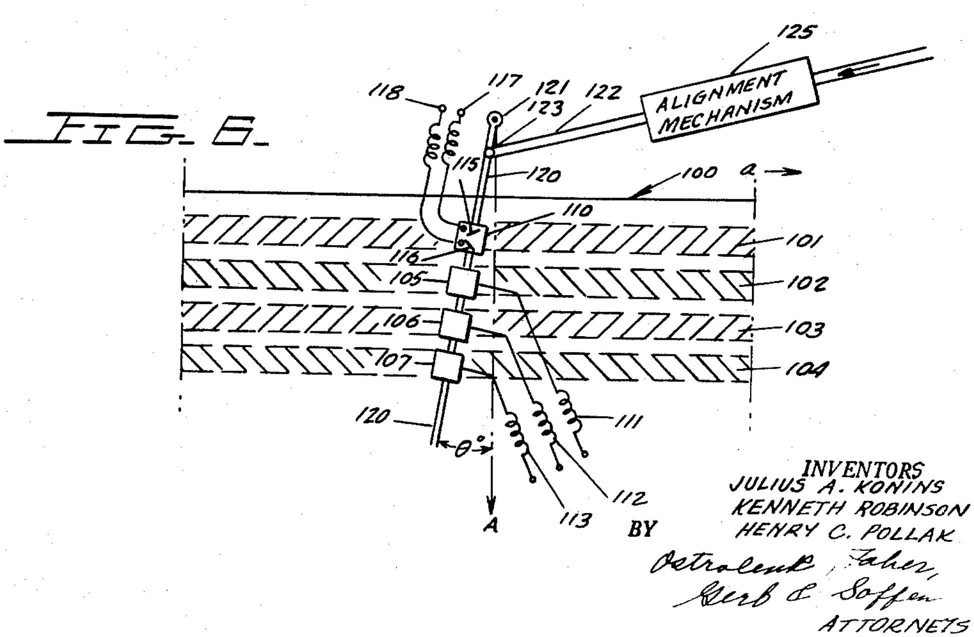
Figure 6 is a diagrammatic illustration of a multi-track aligning system, constituting a further embodiment of the present invention.

Figure 6 illustrates an application of the present invention for multiple track recording and transcription systems, such as for telemetering, computers and the like. The tape 100 has a plurality of tracks 101 to 104 closely spaced on the magnetic surface of tape 100 and in parallel arrangement. Tracks or channels 102, 103, 104 are suitably transcribed by respective recording heads 105, 106 and 107. Track 101 may be a signal track or one constituting a control signal for the purpose now to be described. A sensing head 110 coacts with track 101. While four tracks are shown on the tape, drum, or film 100, it is to be understood that more tracks with corresponding individual pick-up heads may be used. Heads 105, 106 and 107 have corresponding leads 111, 112 and 113 extending therefrom for their associated amplifiers. The leads 111 to 113 are flexible to permit adjustment movement of their associated heads 105 to 107. The sensing head 110 incorporates non-magnetic gaps 115, 116 corresponding to the pick-ups of Figure 2 shown oriented at an angle to the normal and connect to appropriate filter circuits corresponding to 70, 72 (Figure 5) by leads 117, 118. The common mounting is provided for heads 105, 106, 107, and 110 by rod 120 pivoted 121.

Figure 6 illustrates the plurality of heads displaced at an angle $\theta°$ with respect to the normal azimuth A position for tracks 101 to 104. Such displacement of the heads at $\theta°$ not only provides frequency distortions as set forth hereinabove but introduces an additional important factor, namely, a time or phase lag between the first track 101 and the last track, corresponding to 104 in Figure 6. Such time lag between the subtending tracks on tape 100 travelling in the direction $a$ is represented by the following formula:

$$\Delta t=\frac{D \tan \theta}{V} \tag{2}$$

In the above formula, V represents the tape velocity with respect to the fixed recording heads; D the overall span between the tracks 101 to 104; and $\Delta t$ the time or phase lag due to $\theta°$ deviation.

Such time lag limits the amount of information which can be safely recorded per inch of tape length, particularly in a computer system employing multiple tracks. The displacement $\theta°$ of the common structure on shaft 120, for the multiple heads, is automatically compensated for by the azimuth-seeking system of the invention herein. Output cables 117, 118 from sensing unit 110 are connected to respective filtering units which, in turn, actuate a control system incorporating a comparator corresponding to 76 of Figure 5 and, in turn, a controller and drive unit, to actuate alignment mechanism 125 operable on rod 120. The alignment mechanism unit is schematically shown at 125, having a control rod 122 coupled at 123 with rod 120.

Alignment mechanism 125 operates shaft 122 towards or away from azimuthal direction A and operates to maintain the structure 120 with recording heads 105 to 107 and sensing head 110 in the exact azimuthal A position at all times in a manner similar to the operation of the system of Figure 5 on head 50. Thus, for a given velocity of tape 100, more information, or information at a higher frequency rate, may be incorporated in the system embodying tape 100; and conversely, for a given peak information rate can be used to operate the tape at a smaller velocity with comparable results. The track 101 may be an information track as 102 to 104 or one specially used as a control track with a control signal frequency recorded on it.

Figure 7:
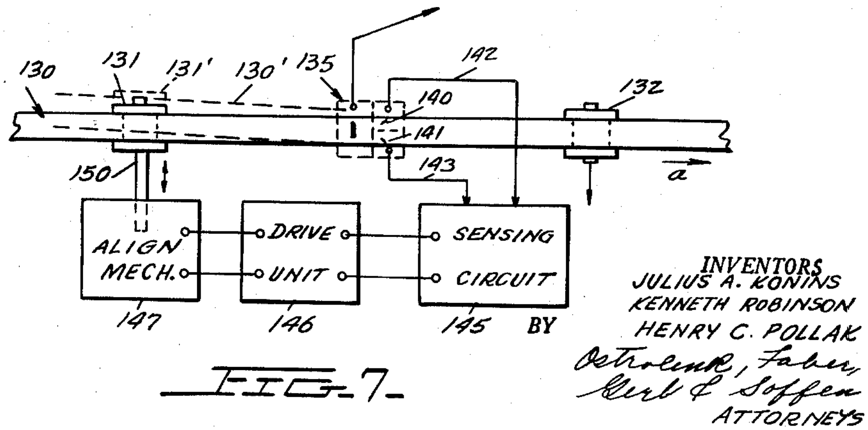
Figure 7 is a diagrammatic illustration of a still further embodiment of the present invention.

The system of the present invention may be equally and reciprocably used to change the alignment of the tape itself, keeping the heads fixed with respect to the structure of the recorder. Towards this end, a schematic arrangement thereof is shown in Figure 7. The recording tape 130 is transported at the recording velocity in the direction $a$ (to the right) across the composite pick-up head 135 between guide rollers 131 and 132 in the usual manner. Pick-up head 135 hereof embodies the main pick-up head 136 indicated transversely of the direction of travel of tape 130 with a flexible output lead 137 for connection to the system amplifier.

The sensing pick-up units are indicated at 140 and 141 as part of the assembly 135, having leads 142 and 143, respectively, connected to the sensing circuit, indicated diagrammatically at 145. Sensing circuit 145 incorporates essentially the circuitry and functions corresponding to the units of Figure 5 for filters 70, 72, amplifier-rectifiers 74, 75, comparator 76 and controller 80. The output of sensing circuit 145 is impressed upon drive unit 146, which in turn operates alignment mechanism 147. Alignment mechanism 147 actuates an output rod 150 transversely of the direction of the longitudinal tape 130. The operation of alignment mechanism 147 and its output shaft 150 corresponds to the mechanism of Figure 5. The longitudinal driving actuation of rod 92 corresponds to the control on rod 150 of Figure 7. The rod 150 is connected to idler or guide roller 131, rotatably mounted on rod 150. Roller 131 is fixed with respect to rod 150 in that it is moved upwardly and downwardly (Figure 7) as rod 150 is actuated by alignment mechanism 147.

When rod 150 is extended upwardly, the roller 131 is moved to the position 131' and tape 130 to position 130' shown in dotted lines in Figure 7. The angular position of the dotted extensions is shown exaggerated from any practical angular displacement from azimuth for the purpose of clarification of illustration herein. The displacement of guide roller 131 which is near transducer 135 creates an angular relationship between the pick-up non-magnetic gap 136 and tape 130. The angle of the tape corresponding to position 130' creates an angular relationship or change with the fixedly held gap 136 and corrects for an azimuthal deviation between the gap 136 and the signals impressed on tape 130, as will now be understood by those skilled in the art.

When the sensing units 140, 141 detect an off-azimuthal relationship between the angle of the pick-up head gap 136 and the recorded signals on tape 130, they impress a differential signal in the proper sense upon the sensing circuit 145. Circuit 145 in turn actuates the drive unit 146 and alignment mechanism 147 to move rod 150 to displace guide roller 131 upwardly or downwardly, as the case may be, to properly adjust the tape 130 across the pick-up gap 136 and correct its azimuthal angle. The system of Figure 7 corresponds to a reciprocal relationship to the systems described hereinabove and accomplishes the same result, namely the correction of the azimuthal angular displacement between the main pick-up head disposition and the signals on the record medium transported across the pick-up head gap.

The angular correction is automatic and continuous throughout the operation of the transcription and corrects the displacements of off-azimuth due to any reason promptly and quickly without imparting any disturbing impulses or signals into the output amplifier. A high quality is maintained throughout the transcription, reproducing faithfully all the highest frequencies impressed upon the tape in their true amplitude relationship as originally recorded. In place of adjusting roller 131, tape tension adjustment may be employed to afford the same results.

Although the present invention has been illustrated and set forth in connection with several exemplary embodiments, further variations and modifications thereof and its application to other types of recording systems and media will now be apparent to those skilled in the art, and it is not intended to be limited except as set forth in the following claims.

We claim:

1. A reproducing system for signals recorded on a medium in an arrangement generally transverse to the longitudinal path of the medium comprising a transducer with a gap arrangeable transversely of the medium path and responsive to the signals recorded on the medium; sensing means oriented along the medium path for determining the angular deviation of said gap to the recorded signals embodying a pair of heads with respective gaps arranged at an acute angle with respect to each other and responsive to the signals recorded on the medium path, whereby the signals picked up by said heads have unequal amplitudes when their orientation with the recorded signals is off optimum; control means in circuit with said heads selectively responsive to signals picked up thereby; and aligning means operable by said control means for motivating said transducer gap continuously into optimum angular relationship with the recorded signals on the medium.

2. A reproducing system for signals recorded on a medium in an arrangement generally transverse to the longitudinal path of the medium comprising a transducer with a gap arrangeable transversely of the medium path and responsive to the signals recorded on the medium; sensing means oriented along the medium path for determining the angular deviation of said gap to the recorded signals embodying a pair of heads with respective gaps and responsive to the signals recorded on the medium path, whereby the signals picked up by said heads have unequal amplitudes when their orientation with the recorded signals is off optimum; control means in circuit with said heads selectively responsive to signals picked up thereby, including comparator circuit means in connection with said heads for deriving a control signal in accordance with the degree and sense of the said off-optimum orientation; and aligning means operable by said control means for motivating said transducer gap continuously into optimum angular relationship with the recorded signals on the medium, said aligning means incorporating a motor operated by said control signal, and mechanism actuated by said motor and coupled with said transducer to motivate it into the optimum orientation.

3. A system for reproducing signals recorded on a linear magnetizable tape in an arrangement generally perpendicular to the longitudinal path of the tape comprising a pick-up head having a magnetic core with a non-magnetic gap arrangeable transversely of the tape path and responsive to the signals recorded on the tape; sensing means oriented along the tape path for determining the optimum angular relation of said gap to the recorded signals for optimum reproduction thereof embodying first and second pick-up members with respective non-magnetic gaps arranged at an acute angle with respect to each other for subtending the signals recorded on the tape path, said members being physically movable with said head with the gaps of said members bearing substantially equal angles with the head gap, whereby the signals picked up by said members have unequal amplitudes when the head orientation with the recorded signals is off-azimuth; control means in circuit with said members selectively responsive to the signals picked up by said members, and aligning means operable by said control means in accordance with the said determined angular relation of said gap for motivating said head gap automatically and continuously into optimum angular relationship with the recorded signals.

4. A system for reproducing signals recorded on a linear magnetizable tape in an arrangement generally perpendicular to the longitudinal path of the tape comprising a pick-up head having a magnetic core with a non-magnetic gap arrangeable transversely of the tape path and responsive to the signals recorded on the tape; sensing means oriented along the tape path for determining the optimum angular relation of said gap to the recorded signals for optimum reproduction thereof embodying first and second pick-up members with respective non-magnetic gaps arranged at an acute angle with respect to each other for subtending the signals recorded on the tape path, said members being physically movable with said head with the gaps of said members bearing substantially equal angles with the head gap, whereby the signals picked up by said members have unequal amplitudes when the head orientation with the recorded signals is off-azimuth; control means in circuit with said members selectively responsive to the signals picked up by said members for deriving a control signal in accordance with the degree of the said off-azimuth orientation, and aligning means operable by said control means in accordance with the said determined angular relation of said gap for motivating said head gap automatically and continuously into optimum angular relationship with the recorded signals, said aligning means incorporating motive means operated by said control signal, and mechanism actuated by said motive means and coupled with said head to motivate it into the azimuth orientation.

5. A system for reproducing signals recorded on a linear magnetizable tape in an arrangement generally perpendicular to the longitudinal path of the tape comprising a pick-up head having a magnetic core with a non-magnetic gap arrangeable transversely of the tape path and responsive to the signals recorded on the tape; sensing means oriented along the tape path for determining the optimum angular relation of said gap to the recorded signals for optimum reproduction thereof embodying first and second pick-up members with respective non-magnetic gaps arranged at an angle with respect to each other for subtending the signals recorded on the tape path, said members being physically movable with said head with the gaps of said members bearing substantially equal and opposite angles with the head gap, whereby the signals picked up by said members have unequal amplitudes when the head orientation with the recorded signals is off-azimuth; control means in circuit with said members selectively responsive to the signals picked up by said members including first and second filters, respectively, in connection with said members, and comparator circuit means in connection with said filters for deriving a control signal in accordance with the degree and sense of the said off-azimuth orientation, and aligning means operable by said control means in accordance with the said determined angular relation of said gap for motivating said head gap automatically and continuously into optimum angular relationship with the recorded signals, said aligning means incorporating a motor operated by said control signal and mechanism actuated by said motor and coupled with said head to motivate it into the said azimuth orientation.

6. A system for reproducing signals recorded on a linear magnetizable tape in an arrangement generally perpendicular to the longitudinal path of the tape comprising a pick-up head having a magnetic core with a non-magnetic gap arrangeable transversely of the tape path and responsive to the signals recorded on the tape; sensing means oriented along the tape path for determining the optimum angular relation of said gap to the recorded signals for optimum reproduction thereof embodying first and second pick-up members with respective non-magnetic gaps arranged at an angle with respect to each other for subtending the signals recorded on the tape path, said members being physically movable with said head with the gaps of said members bearing substantially equal and opposite angles with the head gap, whereby the signals picked up by said members have unequal amplitudes when the head orientation with the recorded signals is off-azimuth; control means in circuit with said members selectively responsive to the signals picked up by said members, including first and second high frequency pass filters, respectively, in connection with said members, comparator circuit means in connection with said filters for deriving a control signal in accordance with the degree and sense of the said off-azimuth orientation, and drive means responsive to said control signal to produce a corresponding control current, and aligning means operable by said control means in accordance with the said determined angular relation of said gap for motivating said head gay automatically and continuously into optimum angular relationship with the recorded signals, said aligning means incorporating motive means operated by said control current, and mechanism actuated by said motive means and coupled with said head and members to motivate them into the azimuth orientation.

7. A system for reproducing signals recorded on a linear magnetizable medium in an arrangement generally perpendicular to the longitudinal path of the medium with a plurality of independent parallel tracks comprising a plurality of head units with individual non-magnetic gaps across said tracks, said head units being mechanically coupled together; sensing means oriented along the medium path for determining the optimum angular relation of said gaps to the recorded signals embodying a pair of pick-up members with respective non-magnetic gaps arranged at an acute angle with respect to each other and responsive to signals recorded solely along a single one of said tracks, said members being physically movable with said head units with the gaps of said members bearing substantially equal and opposite angles with the head gaps, whereby signals picked up by said members have unequal amplitudes when their orientation with the recorded signals is off-optimum; control means in circuit with said members selectively responsive to the signals picked up thereby for deriving a control signal in accordance with the degree of the said off-optimum orientation; and aligning means operable by said control signal for motivating said head units continuously into optimum angular relationship with the recorded signals on the medium.

8. A system for reproducing signals recorded on a linear magnetizable medium in an arrangement generally perpendicular to the longitudinal path of the medium with a plurality of independent parallel tracks comprising a plurality of head units with individual non-magnetic gaps across said tracks, said head units being mechanically coupled together; sensing means oriented along the medium path for determining the optimum angular relation of said gaps to the recorded signals embodying a pair of pick-up members with respective non-magnetic gaps arranged at an acute angle with respect to each other and responsive to signals recorded solely along a single one of said tracks, said members being physically movable with said head units with the gaps of said members bearing substantially equal and opposite angles with the head gaps, whereby signals picked up by said members have unequal amplitudes when their orientation with the recorded signals is off-optimum; control means in circuit with said members selectively responsive to the signals picked up thereby for deriving a control signal in accordance with the degree of the said off-optimum orientation; and aligning means operable by said control signal for motivating said head units continuously into optimum angular relationship with the recorded signals on the medium, said aligning means incorporating motive means operated by said control signal, and mechanism actuated by said motive means and coupled with said head units to motivate them into the optimum orientation.

References Cited in the file of this patent

UNITED STATES PATENTS

| | | |
|---|---|---|
| 2,656,419 | Dingley | Oct. 29, 1953 |
| 2,678,971 | Barany | May 18, 1954 |
| 2,673,897 | Rettinger | Mar. 30, 1954 |
| 2,751,439 | Burton | June 19, 1956 |

FOREIGN PATENTS

| | | |
|---|---|---|
| 683,090 | Great Britain | Nov. 19, 1952 |
| 174,220 | Austria | Mar. 10, 1953 |